United States Patent [19]

Altus

[11] Patent Number: 4,692,364
[45] Date of Patent: * Sep. 8, 1987

[54] RETAINER FOR AUTOMOTIVE FLOOR MAT

[75] Inventor: Mark Altus, Huntington Woods, Mich.

[73] Assignee: The 2500 Corporation, Birmingham, Mich.

[*] Notice: The portion of the term of this patent subsequent to May 13, 2003 has been disclaimed.

[21] Appl. No.: 797,610

[22] Filed: Nov. 12, 1985

[51] Int. Cl.$^4$ ............................ B32B 3/06; B60J 9/00
[52] U.S. Cl. .................................... 428/85; 296/1 F; 428/99; 428/179; 428/343
[58] Field of Search .................. 428/99, 179, 85, 343; 296/1 F; 15/238

[56] References Cited

U.S. PATENT DOCUMENTS

| | | | |
|---|---|---|---|
| 3,823,058 | 7/1974 | Yamaguchi | 428/85 |
| 4,340,633 | 7/1982 | Robbins, Jr. | 428/99 |
| 4,481,240 | 11/1984 | Roth | 296/1 F |
| 4,588,628 | 5/1986 | Roth | 428/85 |

Primary Examiner—Paul J. Thibodeau
Attorney, Agent, or Firm—Gifford, Groh, VanOphem, Sheridan, Sprinkle and Dolgorukov

[57] ABSTRACT

There is disclosed an improved retainer for an automative floor mat generally having an upper bristled surface and a lower bristled surface divided by a planar surface. The bristles are removed from the upper and/or lower surface where the retainer is to contact the heel pad of an automative carpet. A non-slip surface may be provided on one or both sides of the retainer where the bristles have been removed.

48 Claims, 11 Drawing Figures

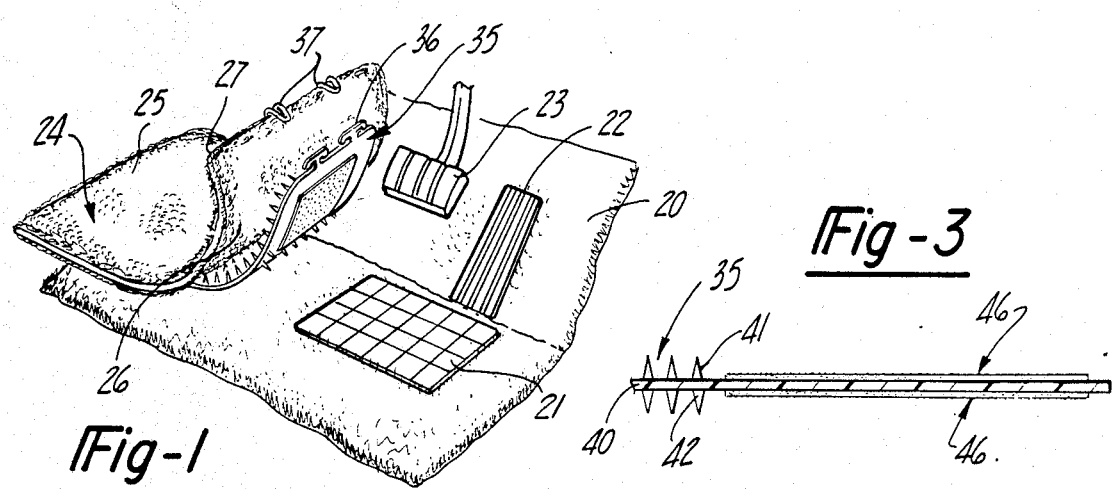
*Fig-1*
*Fig-3*
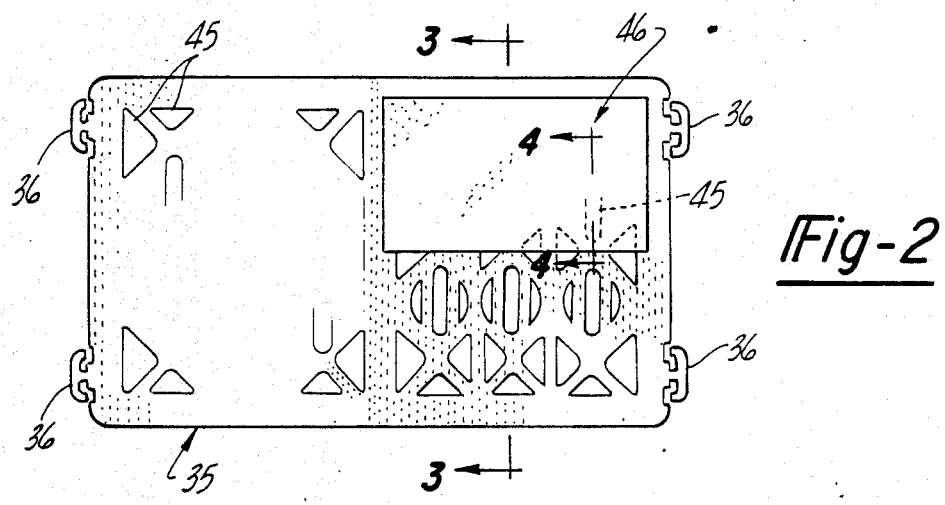
*Fig-2*
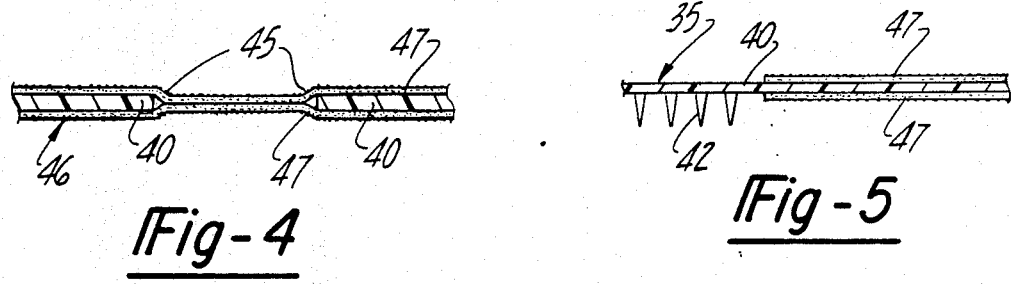
*Fig-4*
*Fig-5*
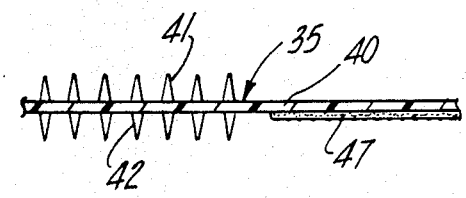
*Fig-6*
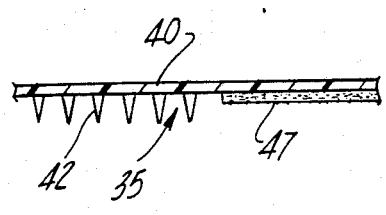
*Fig-7*

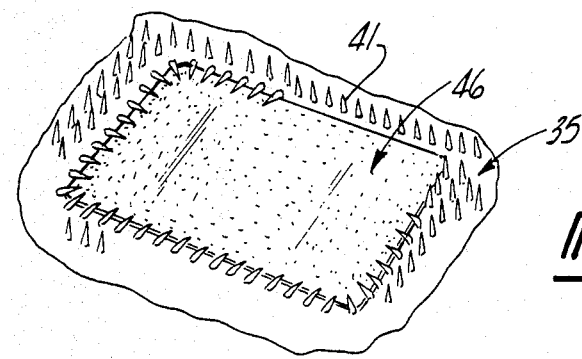
_Fig-8_
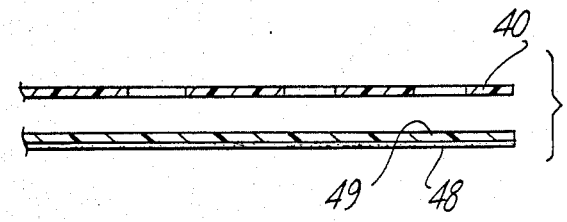
_Fig-9_
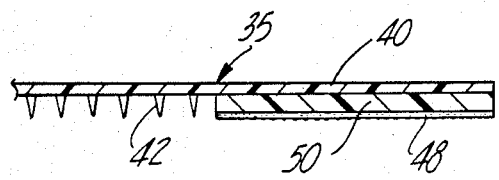
_Fig-10_
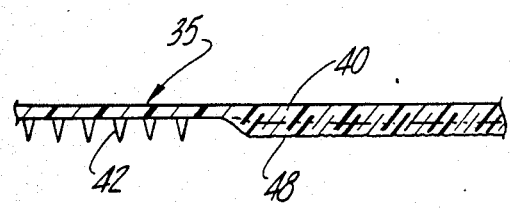
_Fig-11_

RETAINER FOR AUTOMOTIVE FLOOR MAT

CROSS REFERENCES TO RELATED APPLICATIONS

The present application is related to the U.S. patent application Ser. No. 06/658,643, of David W. Roth, filed Oct. 9, 1984, and assigned to applicant's assignee. Thus, the present application and the related application are under common ownership. The retainer disclosed herein is an improved version of the retainer disclosed in said earlier application.

FIELD OF INVENTION

The present invention consists of an improvement to the retainer disclosed in the above mentioned patent application. The portions of said earlier application, which are not repeated in the present application, are specifically incorporated herein by reference.

Referring to the retainer in said earlier application, it can be seen that no matter which embodiment of the retainer is involved, although not required by the disclosure of the application, or the claims, the underside of the retainer that comes in contact with the automotive carpet has bristles shown over the entire surface thereof. Even though portions of the retainer might be perforated to save weight, as disscused in one embodiment of the invention, whereever there is a planar surface present as part of the retainer, there is a lower bristled surface showing bristles depending downwardly therefrom. It has been found in certain applications, especially in lower priced automobiles, which have lighter carpet than luxury vehicles, that the lower bristled surface, where it comes in contact with the vinyl heel pad of the automotive carpet, may slip on the smooth vinyl surface and cause problems such as excessive twisting of the retainer, putting extra stress on the mounting means, or in cases wherein the heel pad is very large, slippage of the floor mat itself, which could have safety implications for the operator of the motor vehicle.

Therefore, it is an object of the present invention to provide an improved retainer for automotive floor mats which do not have slippage problems when encountering the heel pad present in many automotive vehicle carpets.

It is a further object of the present invention to provide an improved retainer of the foregoing nature in combination with an automotive floor mat which will reliably remain in place during operation of the motor vehicle, as well as during entry and exit of the vehicle, even in vehicles which may have large heel pads and/or lightweight carpet.

A further object of the present invention is to provide an improved retainer for an automotive floor mat which does not slip when encountering heel pads on automotive carpets but which is of approximately the same weight as the retainer in said earlier patent application.

A still further object of the present invention is to provide an improved retainer for an automotive floor mat having a non slip surface on the retainer where it is to contact a heel pad.

A still further object of the present invention is to provide a retainer of the foregoing nature which is hingedly mounted to an automotive floor mat.

Further objects and advantages of the present invention will be apparent from the following description and appended claims, reference being made to the accompanying drawings forming a part of this specification, wherein like reference characters designate corresponding parts in the several views.

SUMMARY OF THE INVENTION

In order to solve the aforementioned slippage and safety problems, and still have a retainer which does not move during operation of the motor vehicle, or during entry and exit from the same, I have provided a retainer which is hingedly mounted to the floor mat and which has downwardly depending bristles on the lower surface of the retainer. The bristles are removed from the lower and/or upper surface of the retainer where it is contemplated the retainer will meet a heel pad of an automotive vehicle carpet. In a modification of my invention, in addition to having the bristles removed, a non-slip surface appropriate for the particular application is provided. The amount of bristles removed, and the shape left by the removed bristles, and/or filled by the non-slip surface will depend upon the particular automobile the floor mat is to be used.

BRIEF DESCRIPTION OF THE DRAWINGS

FIG. 1 is an exploded perspective view of an improved retainer embodying the construction of the present invention.

FIG. 2 is a plan view of the underside of the retainer shown in FIG. 1.

FIG. 3 is a sectional view taken in the direction of the arrows along the section line 3—3 of FIG. 2.

FIG. 4 is a sectional view taken in the direction of the arrows along the section line 4—4 of FIG. 2.

FIG. 5 is a view similar in part to FIG. 3, but showing bristles only on one side of the retainer.

FIG. 6 is view similar in part to FIG. 5, but showing bristles on both sides of the retainer, with a non-slip surface mounted only on one side of the retainer.

FIG. 7 is view similar in part to FIG. 3 but showing bristles and the non-slip surface only on one side of the retainer.

FIG. 8 is a partial perspective view of the retainer shown in FIG. 2 with the non-slip surface heat staked to the retainer.

FIG. 9 is an enlarged sectional view showing a modification of the present invention where the non-slip surface is mounted to a base, which is in turn mounted to the retainer.

FIG. 10 is a view similar to FIG. 9, showing a further modification of my invention.

FIG. 11 is a view similar in part to FIGS. 9 and 10, but showing the non-slip surface molded integrally with the retainer.

It is to be understood that the present invention is not limited in its application to the details of construction and arrangment of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Referring to FIG. 1, there is shown a partial perspective view of a typical automobile interior. Illustrated is the automotive carpet 20 having a heel pad 21, usually made out of vinyl, or other like material. Typical of today's automobile, there is illustrated an accelerator pedal 22 and a brake pedal 23 in proximity to the heel pad. The heel pad 21 is provided so that the carpet 20 is not worn through by the constant motion of the operator's foot between the accelerator pedal and the brake pedal. It is the heel pad 21 which caused problems with the retainer used in the aforementioned co-pending patent application, Ser. No. 06/658,643, for reasons to be further explained below.

There is also illustrated, for use in an automotive-type vehicle, a typical floor mat, generally designated by the numeral 24, and consisting of two like pieces of carpeting placed back to back and bound by a suitable edge binding to produce an upper carpeted surface 25, and a lower carpeted surface 26 bound by a suitable edge binding 27.

It should be understood that the retainer of the present invention can be used with all modifications of the floor mat 24 described is said patent application Ser. No. 06/658,643, such as the typical two-sided floor mat illustrated herein, usually found in luxury cars, the one-sided floor mat with a rubber backing, sometimes found in less expensive cars or in the aftermarket, or with some other variation of floor mat.

Referring to FIGS. 1 and 2, the retainer, generally designated by the numeral 35, is shown operatively mounted to the underside of the floor mat 24. As before, a hook-like tab 36 is intregally formed near each corner of the retainer 35, and fits in a mating properly placed loop 37 sewn, molded or attached to the floor mat 24 before or after the edge binding 27 is applied.

It should be understood that any of the modifications of the hook-like tab 36 or the loops 37 described in said co-pending application can be used satisfactorily with the retainer of the present invention. For ease of description, I shall consider any combination of the hook-like tabs and mating loops to be the "mounting means" of the present invention. As before, when the floor mat 24 is to be reversed to provide for additional wear by utilizing the other of the carpeted surfaces, two of the hook-like tabs 36 are disconnected from their mating loops 37, and the remaining two (2) tabs and loops provide a hinge-like means for rotating the retainer through approximately 360 degrees, and then the tabs are re-attached to the loops on the opposite side of the mat. This provides for greatly increased longevity of the carpeted surfaces of the mat.

I have shown my invention in a preferred embodiment having four sets of mounting means, such as the tabs 36 and the loops 37. It can be seen that more or less than four (4) attaching means may be used, depending on the particular application to which my floor mat is to be put.

Also, while I have shown the loops at either side of the floor mat 24, it should be understood that, depending on the configuration of the floor pan of the vehicle in which the retainer is mounted, the mounting means may be mounted to the front of the floor mat 24, and the retainer 35 may flip over in a fore and aft direction, and still acheive the purposes of the present invention.

The retainer 35 is generally constructed in the same manner as the retainer disclosed in said co-pending patent application, Ser. No. 06/658,643. As before, there is a planar surface 40 which generally divides an upper bristled surface 41 from a lower bristled surface 42. Since the retainer, in the preferred embodiment, is intended to be reversible, the upper bristled surface 41 is generally made identical to the lower bristled surface 42. Since the retainer 35 is hingedly attached to the floor mat 24 and, therefore, relatively immoveable, it is again an important consideration to make the bristles of the proper length to make the retainer as immovable as possible in the automotive carpet. It is preferable to make the bristles of the retainer of a length no more that three quarters of the average length of the automotive carpet 20. Since the upper bristled surface 41 will be in contact with the lower carpeted surface 26 of the floor mat 24, and it is still desired that said upper bristled surface aid in preventing relative movement between the retainer and the floor mat, it is desireable, if possible to choose the length of the bristles so that they meet both of the requirements that the length of the bristles forming the upper and lower bristled surfaces be no more than three quarters of the average length of the automotive carpet 20, and are no longer the one half to three quarters of the length of said lower carpeted surface 26 of said floor mat 24. Since, in many cases, the length of carpeting used to make the floor mat 24 is identical or approaching the length of the automotive carpet 20 meeting this requirement is not as difficult as it might seem.

However, if the floor mat 24 does not have a lower carpeted surface 26, and thus is not reversible, so that the retainer 35 will only be used on one side thereof, the upper bristled surface 41 and the lower bristled surface 42 do not need to be symetrical, and the bristles forming the upper bristled surface 41 may be much shorter, if desired, than the bristles forming the lower bristled surface 42 being just long enough to provide friction between the floor mat 24 and the retainer 35. In some applications it is contemplated that no bristles at all will be needed, and my retainer will consist of a planar surface 40 having only a lower bristled surface 42 depending downwardly therefrom. In this case, of course, all the additional durability due to the reverseability of the two piece floor mat having carpeting on both sides will be lost.

Referring to FIGS. 2-7, my improved retainer, taking into account these various modifications may be seen. As can be seen in FIG. 2, the retainer 35 may have perforations of various sizes and shapes, if desired, to lighten the weight of the thereof. On the portion of the retainer which will be positioned over the heel pad 21 the bristles have been completely removed, and a non-slip surface, generally designated by the numeral 46 has been applied.

As shown in FIG. 3, the non-slip surface 46 may be applied to both sides of the retainer 35, and the retainer may have any upper bristled surface 41 depending from the planar surface 40, as well as a lower bristled surface 42 depending from the other side of the planar surface 40.

As seen in FIG. 4, the non-slip surface 46 may be such as a self adhesive non-slip surface, and may be manufactured out of such materials as the "anti-slip" tape sold under the "Scotch" brand by the 3M Corporation does the non-stick backing of the tape 47 stick to the planar surface 40 of the retainer 35, but it sticks to itself anywhere there is a perforation 45. Since the retainer 35 may be made out of rather slippery plastic material in some instances, such as polyethylene, the additional feature of having the "anti-slip" tape stick to itself in addition to the planar surface of the retainer is obvious.

As shown in FIGS. 3 and 5, the "non-slip" tape 47 may be applied on both sides of the retainer 35 whether it has bristles on one side or both.

Or, as shown in FIGS. 6 and 7, the "non-slip" tape 47 may be applied on one side of the retainer 35 whether or not the retainer has bristles on both sides, or not.

It is important, whether or not the "non-slip" surface 46 is on one or both sides of the retainer 35, that the bristles be removed from the retainer for substantially the area where it will be contacting the heel pad 21 of the automotive carpet 20, as it is this area which the bristles cannot contact, if the slippage and safety problems heretofore mentioned are to be avoided.

Although it will normally be sufficient, depending upon the materials used for the automotive carpet 20 and the retainer 35, to just remove the bristles from the area of the retainer which will contact the heel pad, or as in the preferred embodiment, to place one or two pieces of non-stick tape 47 in the area of the retainer which has the bristles removed, other embodiments of the non-slip surface may be required depending on the particular application to which the retainer 35 is applied. Since the non-slip surface 46 could be any material which, when placed against the heel pad 21, provides a high co-efficient of friction, for the examples shown in FIGS. 9–11 the term "non-slip" material shall be used to cover any of these types of materials in a generic sense.

In FIG. 9 it is contemplated that in some types of applications, since the bristles are fairly long, it may be necessary to "build out" the non-slip material 48 by placing it on a base 49 before mounting it, in any suitable manner, to the planar surface 40 of the retainer.

In the modification of the invention shown in FIG. 10 there is mounted to the planar surface 40 a very soft rubber-like material 50 placed between the planar surface and the non-slip material 48.

In FIG. 11, by the use of present day molding technology whereby two materials may be injected into a mold simultaneously, the non-slip material 48 is shown formed integrally with the planar surface 40 of the retainer 35.

Except for the modification shown in FIG. 11, regardless of what non-slip surface 46 is used, and to what it is mounted, an alternate means of mounting same to the retainer 35 is shown in FIG. 8. In this case a row of bristles from either the upper bristled surface 41 or the lower bristled surface 40 is left upstanding immediately adjacent the area to be occupied by the non-slip surface 46, and then these bristles are bent over on to the non-slip surface by a process called "heat staking", which is well known in the art.

If desired, this may even be used if the non-slip surface 46 comprises pieces of non-slip tape 47 to provide additional holding power.

It has been found in some cars, especially in the smaller foreign and domestic cars, that the shape of the floor pan of the automobile makes the use of a full size retainer impracticable, as the shape of the floor will tend to raise one or more sides of the retainer 35 and give it a bulky effect. Generally, reducing the size of the retainer while the upper bristled surface 41 and the lower bristled surface 42 stay at a uniform height throughout the retainer has proven less desirable than putting a taper on either the upper bristled surface 41 or the lower bristled surface, 42 for all or part of their lengths. Also, depending on the design of the floor pan, such a taper may be from the front to the back, or from one side to the other side of the retainer. Although modifications of my retainer with the bristles tapered have not been shown in the present application, it is to be understood that the use of such taper on either the upper bristled surface 41, the lower bristled surface 42, or any portion thereof, is well within the scope of the claims.

No matter whether the retainer 35 has a uniform height of bristles on its upper and lower surfaces for its entire length, some portion of this length tapered, or some other configuration as aforementioned, it is in some instances desirable to provide perforations, such as the perforations 45, in the retainer to reduce the weight thereof in view of the current emphasis on keeping the weight of the automobile to a minimum, and thus increasing fuel economy. The number and shape of the perforations may vary depending upon the particular application to which the floor mat is to be put, and the amount of weight it is desired to save. Perforations 45 may or may not be provided under the non-slip surface 46 depending upon the particular material to be used in forming the surface.

In the preferred embodiment, using the non-slip tape 47, perforations 45 would generally be provided over the entire area of the retainer 35, while if the heat staking shown in FIG. 8 were to be used, depending upon which non-slip surface, was used, i.e. the tape 47, or one of the variations shown in FIGS. 9 and 10, perforations may or may not be provided under the non-slip surface 46.

If perforations are provided in the retainer, it is obvious that the overall density of the bristles on the retainer will be less than if the perforations were not provided. It is still preferable, if possible, that the density of the bristles on the portion of the retainer still having them are from 50% to 100% of the density of the lower carpeted surface 26 of the floor mat 24. Thus, by providing an improved retainer eliminating a possible slippage problem associated with earlier automotive floor mat retainers, I have invented a device which is simple, economical, and attractive in appearance, and which solves the problem of the movement of the floor mat in a vehicle having a heel pad during the operation of said vehicle, as well as during entry and exiting by the occupants of said motor vehicle.

I claim:

1. An improved retainer for an automotive floor mat used on automotive carpets having heel pads, said retainer including:
   (a) a planar surface;
   (b) a lower bristled surface having bristles of uniform height depending downwardly from said planar surface and covering the entire area thereof except where said lower bristled surface is to contact said heel pad of said automotive carpet, and
   (c) a non-slip surface being provided where said bristles have been removed,
   (d) mounting means for attaching said retainer to said floor mat.

2. The device defined in claim 1, wherein said bristles forming said lower bristled surface are formed in a manner to provide a taper to at least part of said lower bristled surface.

3. The device defined in claim 1, wherein said retainer includes:
   (a) an upper bristled surface having bristles of uniform height depending upwardly from said planar surface and covering the entire area thereof except where said upper bristled surface may contact a heel pad of said automotive carpet.

4. The device defined in claim 3, wherein the bristles forming said upper bristled surface are formed in a manner to provide a taper to at least part of said upper bristled surface.

5. The device defined in claim 1, and having suitable perforations provided in said retainer to reduce weight.

6. The device defined in claim 2, and having suitable perforations provided therein to reduce weight.

7. The device defined in claim 3, and having suitable perforations provided therein to reduce weight.

8. The device defined in claim 4, and having suitable perforations provided therein to reduce weight.

9. The device defined in claim 3, wherein the length of the bristles forming said lower bristled surface is no more than three quarters of the average length of said automotive carpet material.

10. The device defined in claim 9, wherein said automotive floor mat has an upper and a lower carpeted surface and the length of the bristles forming said upper bristled surface is no longer than one half to three quarters of the length of said lower carpeted surface of said floor mat.

11. The device defined in claim 1, wherein said non-slip surface consists of a non-slip material.

12. The device defined in claims 11, wherein said non-slip material includes a self adhesive non-slip surface.

13. The device defined in claim 12, wherein said self adhesive non-slip surface consists of an anti-slip tape.

14. The device defined in claim 11, wherein said non-slip material is built out from said planar surface.

15. The device defined in claim 11, wherein said non-slip material is formed integrally with said retainer.

16. The device defined in claim 11, wherein a rubber like material is interposed between said planar surface and said non-slip material.

17. A floor mat construction for use on automotive carpets having heel pads including:
(a) at least one carpeted surface;
(b) mounting means for securing a retainer to said floor mat; and
(c) a retainer having bristles on at least one side thereof except where said retainer is to contact said heel pad of said automotive carpet, said retainer hingedly attached to said floor mat by said mounting means for rotation through approximately 360 degrees,
(d) a non-slip surface being provided where said bristles have been removed.

18. The device defined in claim 17, where said floor mat construction includes:
(a) an upper carpeted surface;
(b) a lower carpeted surface; and
(c) an edge binding joining said upper and said lower carpeted surface.

19. The device defined in claim 18, wherein said mounting means include:
(a) at least one hook-like tab provided on said retainer; and
(b) at least one mating loop affixed about the perimeter of said floor mat.

20. The device defined in claim 18, wherein said mounting means include:
(a) at least one rounded extension provided on said retainer;
(b) at least one strap attached proximate the perimeter of said floor mat, said strap having a suitable opening therein.

21. The device defined in claim 18, wherein said mounting means include:
(a) at least one living hinge provided on said retainer and fixedly attached to said floor mat.

22. The device defined in claim 18, wherein said mounting means include:
(a) at least one clip fixedly attached to said floor mat; and
(b) at least one mating clip opening provided in said retainer.

23. The device defined in claim 18, wherein said mounting means include:
(a) at least one strap attached proximate the perimeter of said floor mat, said strap having a suitable opening therein; and
(b) at least one flat extension provided on said retainer.

24. The device defined in claim 18, wherein said mounting means include:
(a) at least one flat tab provided on said retainer and fixedly attached to said floor mat.

25. The device defined in claim 18, wherein said flat tab has an elongated hole provided therein.

26. The device defined in anyone of claims 17-25, wherein said retainer includes:
(a) a planar surface; and
(b) a lower bristled surface having bristles of uniform height depending downwardly from said planar surface and covering the entire area of said retainer except where said lower bristled surface is to contact said heel pad of said automotive carpet.

27. The device defined in claim 26, wherein said bristles forming said lower bristled surface are formed in a manner to provide a taper to at least part of said lower bristled surface.

28. The device defined in claim 26, wherein said retainer includes:
(a) an upper bristled surface having bristles of uniform height depending upwardly from said planar surface and covering the entire area of said retainer except where said upper bristled surface contacts said heel pad of said automotive carpet.

29. The device defined in claim 28, wherein the bristles forming said upper bristled surface are formed in a manner to provide a taper to at least part of said upper bristled surface.

30. The device defined in claim 26, and having suitable perforations provided in said retainer to reduce weight.

31. The device defined in claim 27, and having suitable opening perforations provided in said retainer to reduce weight.

32. The device defined in claim 28, and having suitable perforations provided in said retainer to reduce weight.

33. The device defined in claim 29, and having suitable perforations provided in said retainer to reduce weight.

34. The device defined in claim 26, wherein the length of the bristles forming said lower bristled surface is no more than three quarters of the average length of said automotive carpet material.

35. The device defined in claim 34, wherein said automotive floor mat has an upper and a lower carpeted surface and the length of the bristles forming said upper bristled surface is no longer than ½ to ¾ of the length of said lower carpeted surface.

36. The device defined in claim 35, wherein the density of the bristles forming said upper bristled surface and said lower bristled surface is from fifty to one-hundred percent of the density of said lower carpeted surface where bristles are provided on said retainer.

37. The device defined in claim 26, wherein said non-slip surface consists of a non-slip material.

38. The device defined in claim 37, wherein said non-slip material includes a self-adhesive non-slip surface.

39. The device defined in claim 38, wherein said self adhesive non-slip surface consists of an anti-slip tape.

40. The device defined in claim 37, wherein said non-slip material is built out from said planar surface.

41. The device defined in claim 37, wherein said non-slip material is formed integrally with said retainer.

42. The device defined in claim 37, wherein a rubber like material is interposed between said planar surface and said non-slip material.

43. The device defined in claim 28, wherein said non-slip surface consists of a non-slip material.

44. The device defined in claim 43, wherein said non-slip material includes a self-adhesive non-slip surface.

45. The device defined in claim 44, wherein said self-adhesive non-slip surface consists of an anti-slip tape.

46. The device defined in claim 43, wherein said non-slip material is built out from said planar surface.

47. The device defined in claim 43, wherein said non-slip material is formed integrally with said retainer.

48. The device defined in claim 43, wherein a rubber like material is interposed between said planar surface and said non-slip material.

* * * * *